US009607435B2

(12) United States Patent
Buron et al.

(10) Patent No.: US 9,607,435 B2
(45) Date of Patent: Mar. 28, 2017

(54) METHOD FOR RENDERING AN IMAGE SYNTHESIS AND CORRESPONDING DEVICE

(71) Applicant: THOMSON LICENSING, Issy de Moulineaux (FR)

(72) Inventors: Cyprien Buron, Rennes (FR); Jean-Eudes Marvie, Betton (FR); Pascal Gautron, Rennes (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 14/370,778

(22) PCT Filed: Nov. 8, 2012

(86) PCT No.: PCT/EP2012/072187
§ 371 (c)(1),
(2) Date: Jul. 6, 2014

(87) PCT Pub. No.: WO2013/104448
PCT Pub. Date: Jul. 18, 2013

(65) Prior Publication Data
US 2015/0145863 A1 May 28, 2015

(30) Foreign Application Priority Data
Jan. 10, 2012 (EP) ..................................... 12305027
Jan. 16, 2012 (EP) ..................................... 12305051

(51) Int. Cl.
G06T 17/20 (2006.01)
G06T 15/00 (2011.01)
(Continued)

(52) U.S. Cl.
CPC .......... *G06T 17/205* (2013.01); *G06T 15/005* (2013.01); *G06T 15/10* (2013.01); *G06T 17/005* (2013.01); *G06T 17/20* (2013.01)

(58) Field of Classification Search
None
See application file for complete search history.

(56) References Cited

U.S. PATENT DOCUMENTS 6,606,584 B1 8/2003 Junkins
7,304,643 B2 12/2007 Bronder
(Continued)

OTHER PUBLICATIONS

Tanaka, Kiyoshi, Shuichi Takano, and Tatsuo Sugimura. "Indexed triangle strips optimization for real-time visualization using genetic algorithm: preliminary study." Information Technologies 2000. International Society for Optics and Photonics, 2000.*

(Continued)

*Primary Examiner* — Mark Zimmerman
*Assistant Examiner* — Vu Nguyen
(74) *Attorney, Agent, or Firm* — Jack Schwartz & Associates, PLLC

(57) ABSTRACT

A method and device for rendering a synthesis image comprising generating a plurality of elementary geometries (201 . . . 2i2) from an input geometry, a plurality of vertices being associated with each elementary geometry, each vertex being defined with coordinates; assigning an index value (0, 1 . . . 6, 7) to each elementary geometry of at least a part of the elementary geometries (201 . . . 2i2), the index value being estimated from the coordinates associated with at least one vertex of the elementary geometry, and rendering the synthesis image by using the indexed elementary geometries.

12 Claims, 5 Drawing Sheets

Figure 1:
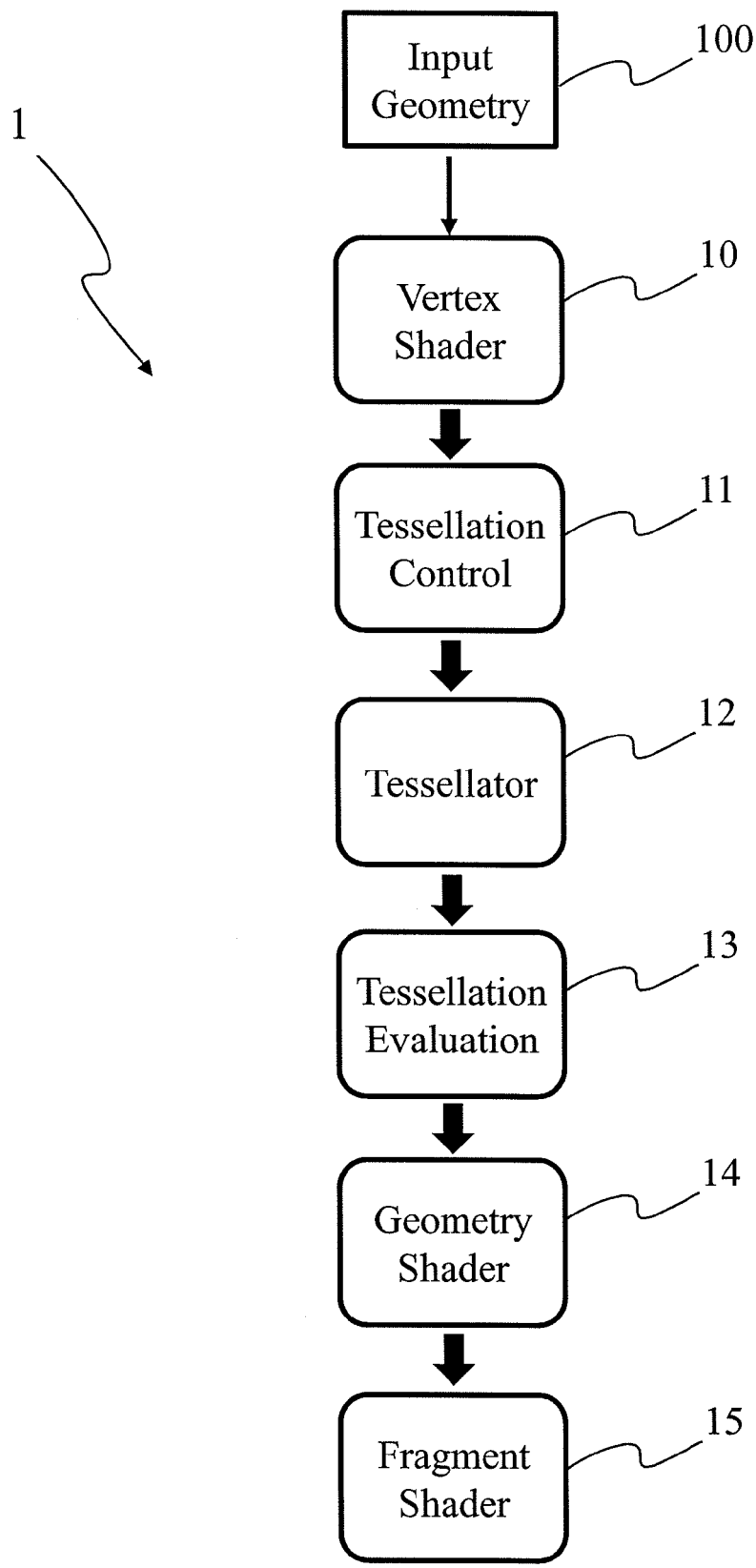

(51) Int. Cl.
*G06T 15/10* (2011.01)
*G06T 17/00* (2006.01)

(56) References Cited

U.S. PATENT DOCUMENTS

| | | | |
|---|---|---|---|
| 7,423,644 B2 | 9/2008 | Goel et al. | |
| 7,978,205 B1* | 7/2011 | Patel | G06T 15/005 345/419 |
| 2011/0057931 A1 | 3/2011 | Goel et al. | |
| 2011/0063294 A1* | 3/2011 | Brown | G06T 15/005 345/423 |
| 2011/0310102 A1 | 12/2011 | Chang | |

OTHER PUBLICATIONS

Mathias, Markus, et al. "Procedural 3D building reconstruction using shape grammars and detectors." 3D Imaging, Modeling, Processing, Visualization and Transmission (3DIMPVT), 2011 International Conference on. IEEE, 2011.*
Tanaka et al :"Indexed Triangle Strips Optimization for Real-Time Visualization Using Genetic Algortihm: Preliminary Study", Proceedings of the SPIE—The Int'l Society for Optical Eng., vol. 4210, 2000, pp. 204-214.
Markus et al:"Procedural 3D Building Reconstruction Using Shape Grammars and Detectors", 3(3DIMPVT), 2011 Int'l Conf. on IEEE, May 16, 2011, pp. 304-311.
Hohmann et al: "A GML shape grammar for semantically enriched ED building models", Computers and Graphics, vol. 34, No. 4, Aug. 2, 2010, pp. 322-334.
Muller et al: Procedural Modeling of Buildings, ACM Transactions on Grpahics (TOG), ACM, US, vol. 25, N° 3, Jul. 1, 2006, pp. 614-623.
Search Report Dated Apr. 17, 2013.

* cited by examiner

METHOD FOR RENDERING AN IMAGE SYNTHESIS AND CORRESPONDING DEVICE

This application claims the benefit, under 35 U.S.C. §365 of International Application PCT/EP2012/072187, filed Nov. 8, 2012, which was published in accordance with PCT Article 21(2) on Jul. 18, 2013 in English and which claims the benefit of European patent application No. 12305027.0 filed Jan. 10, 2012 and European patent application No. 12305051.0 filed Jan. 16, 2012.

1. DOMAIN OF THE INVENTION

The invention relates to the domain of synthesis image composition and more specifically to the identification of geometric primitives (for example points, lines or polygons) of a mesh used for the rendering of the synthesis image. The invention is also understood in the context of special effects for a live composition.

2. PRIOR ART

According to the prior art, it is known to model a scene or a synthesis image by using geometric primitives used for defining surfaces of the virtual objects comprised in the scene. B-Rep (for Boundary Representation) is a known method used for 3D modelling a scene, the surface of the virtual object being represented with a mesh comprising a plurality of geometric primitives, for example triangles or quad defined through their vertices (three vertices for a triangle, four vertices for a quad). When a scene is modelled and rendered via the use of a graphics hardware pipeline, an input geometry, called a patch and corresponding for example to a quadrilateral, is subdivided into a plurality of polygons, for examples a plurality of quadrilaterals or polygons, by the tessellation stage of the graphics hardware pipeline. At the output of the tessellation stage, a plurality of polygons is obtained, the polygons being dependent from each other. It is then not possible to freely use this set of polygons, for example for selecting a given polygon for a given use in the modelling of the virtual objects.

3. SUMMARY OF THE INVENTION

The purpose of the invention is to overcome at least one of these disadvantages of the prior art.

More specifically, the purpose of the invention is to enable a free use of the geometric primitives for rendering a synthesis image.

The invention relates to a method for rendering a synthesis image, comprising the steps of:
  generating a plurality of elementary geometries from an input geometry, a plurality of vertices being associated with each elementary geometry, each vertex being defined with coordinates,
  assigning an index value to each elementary geometry of at least a part of the elementary geometries, the index value being estimated from the coordinates associated with at least one vertex of the elementary geometry, and
  rendering the synthesis image by using the indexed elementary geometries.

According to a particular characteristic, the method comprises a step of determining a number of elementary geometries to be generated.

Advantageously, the synthesis image is generated from a grammar comprising at least a procedural rule and a set of rule parameters, the step of determining the number of elementary geometries comprising the steps of:
  representing the grammar with a tree, the tree being representative of the at least a procedural rule,
  determination of a number of terminal symbols by parsing the tree representative of the at least a procedural rule according to the set of rule parameters,
  the number of elementary geometries to be generated corresponding to the determined number of terminal symbols.

According to a specific characteristic, the method comprises a step of assigning one single indexed elementary geometry to each terminal symbol.

Advantageously, the synthesis image is rendered from the grammar.

According to another characteristic, the elementary geometries correspond to triangles, the triangles being obtained from quadrilaterals subdivided into two triangles, each quadrilateral comprising a lower triangle and an upper triangle, the step of assigning an index value comprising the following steps, implemented for each elementary geometry of the at least a part of the elementary geometries:
  determining the minimal coordinates $(x_{min}, y_{min})$ of the elementary geometry, $x_{min}$ and $y_{min}$ being normalized between 0 and 1,
  determining if the elementary geometry is an upper triangle or a lower triangle,
  determining the index value to be assigned to the elementary geometry, the index value being equal to:
    $i\, x_{min} + 2j\, y_{min}$, if the elementary geometry is a lower triangle, or $$i\, x_{min} + 2ij\left(y_{min} + \frac{1}{2j}\right),$$

if the elementary geometry is an upper triangle,
  wherein i×j corresponds to the number of quadrilaterals.

Advantageously, the step of assigning an index value is implemented in a geometry shader of a graphics hardware pipeline.

The invention also relates to a device configured for rendering a synthesis image, the device comprising at least a processor configured for:
  generating a plurality of elementary geometries from an input geometry, a plurality of vertices being associated with each elementary geometry, each vertex being defined with coordinates,
  assigning an index value to each elementary geometry of at least a part of the elementary geometries, the index value being estimated from the coordinates associated with at least one vertex of the elementary geometry, and
  rendering the synthesis image by using the indexed elementary geometries.

The invention also relates to a computer program product, which comprises instructions of program code for executing steps of the rendering method, when said program is executed on a computer.

4. LIST OF FIGURES

Figure 2A:
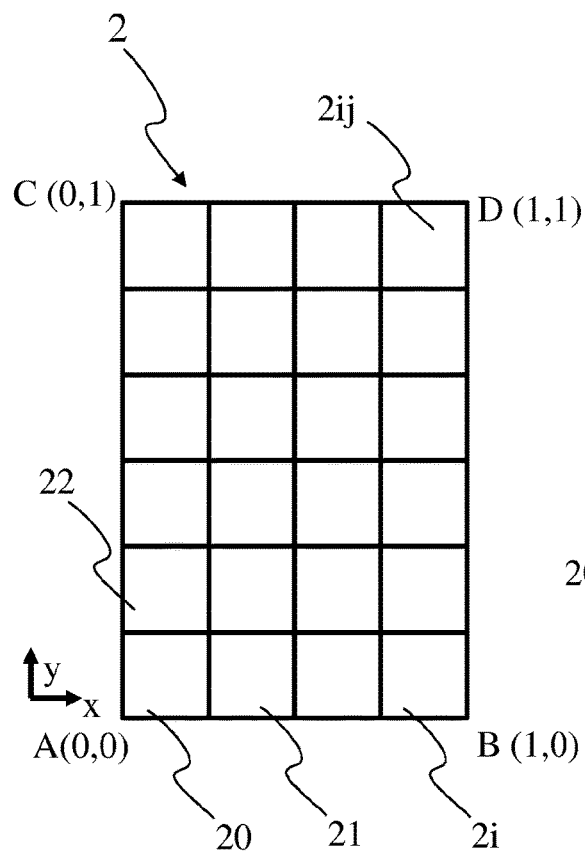
Figure 2B:
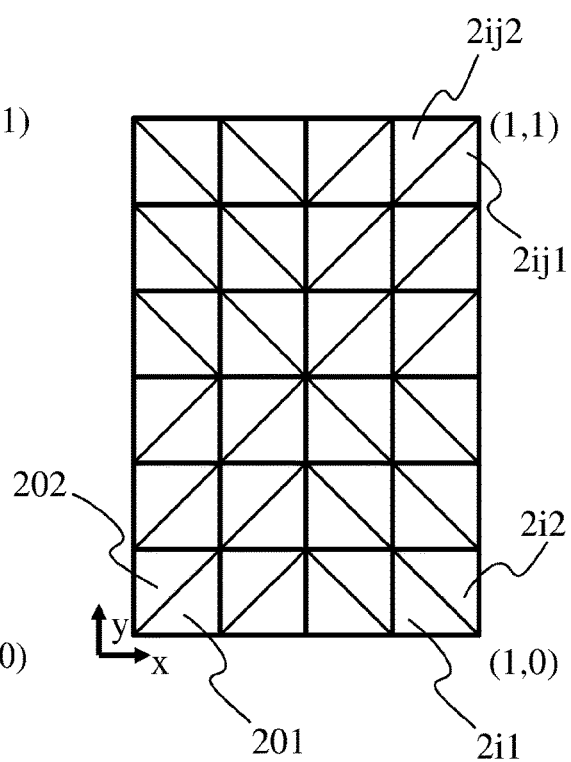
Figure 2C:
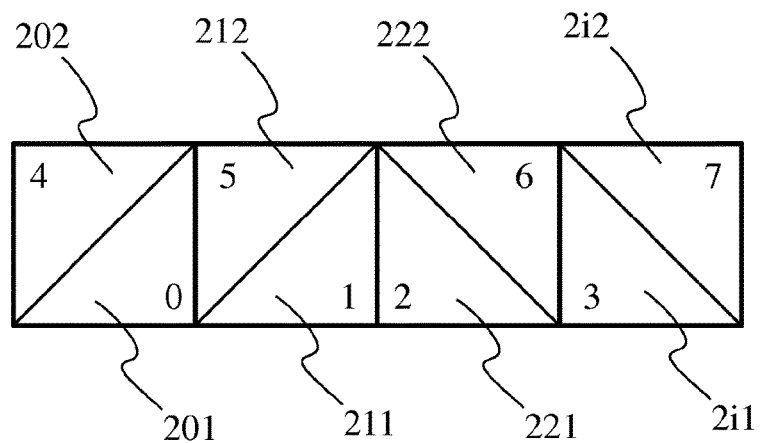
Figure 3:
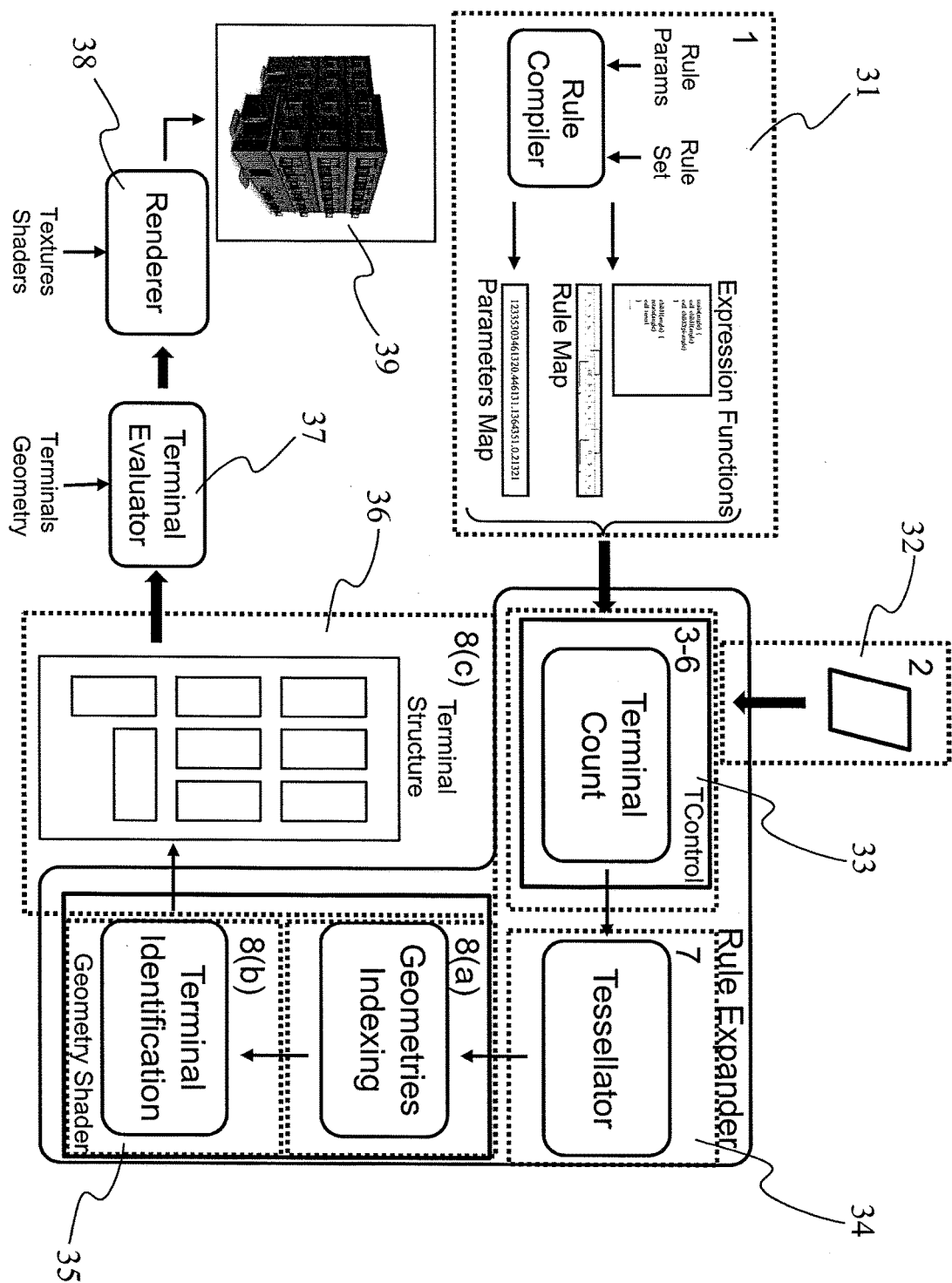
Figure 4:
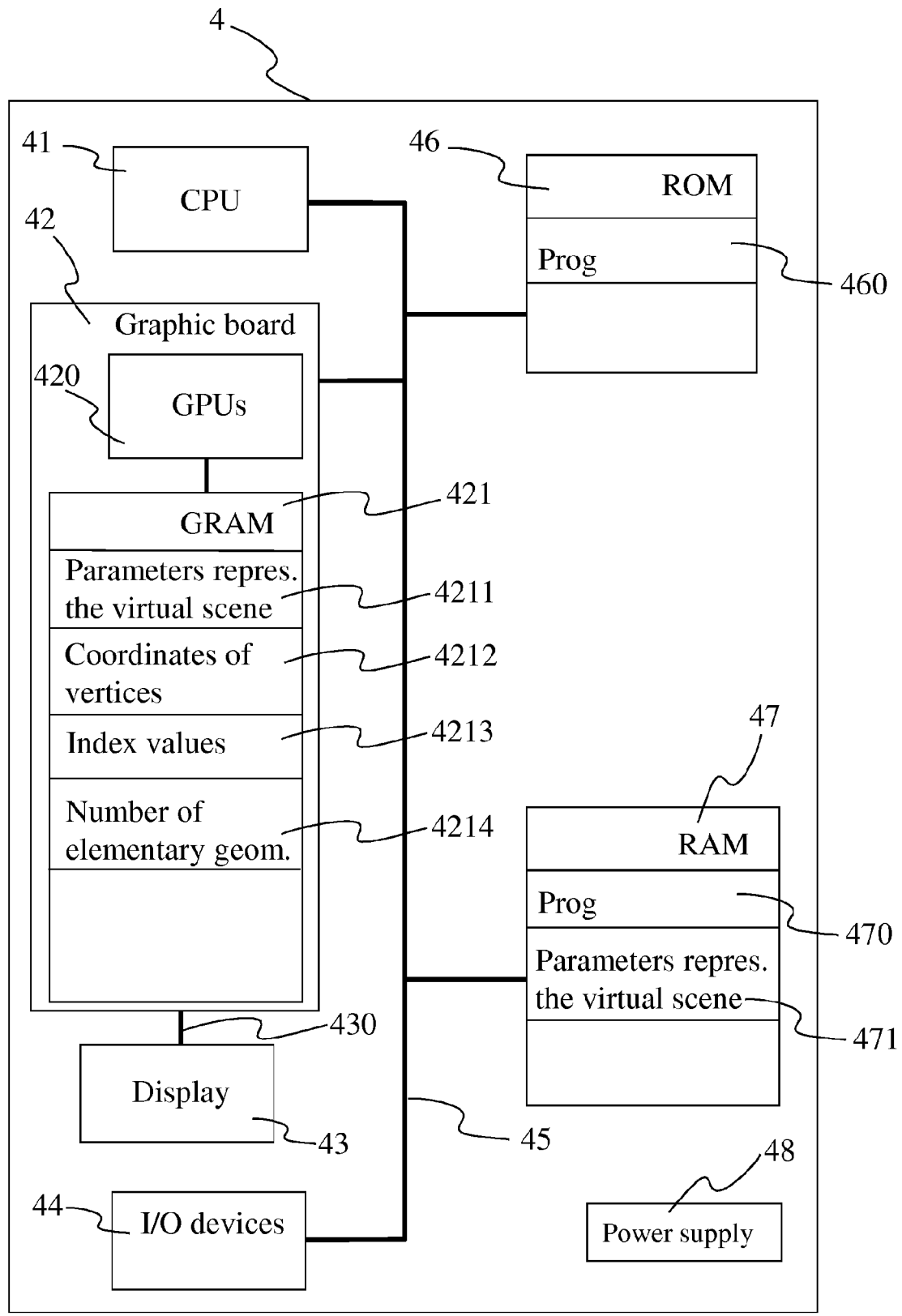
Figure 5:
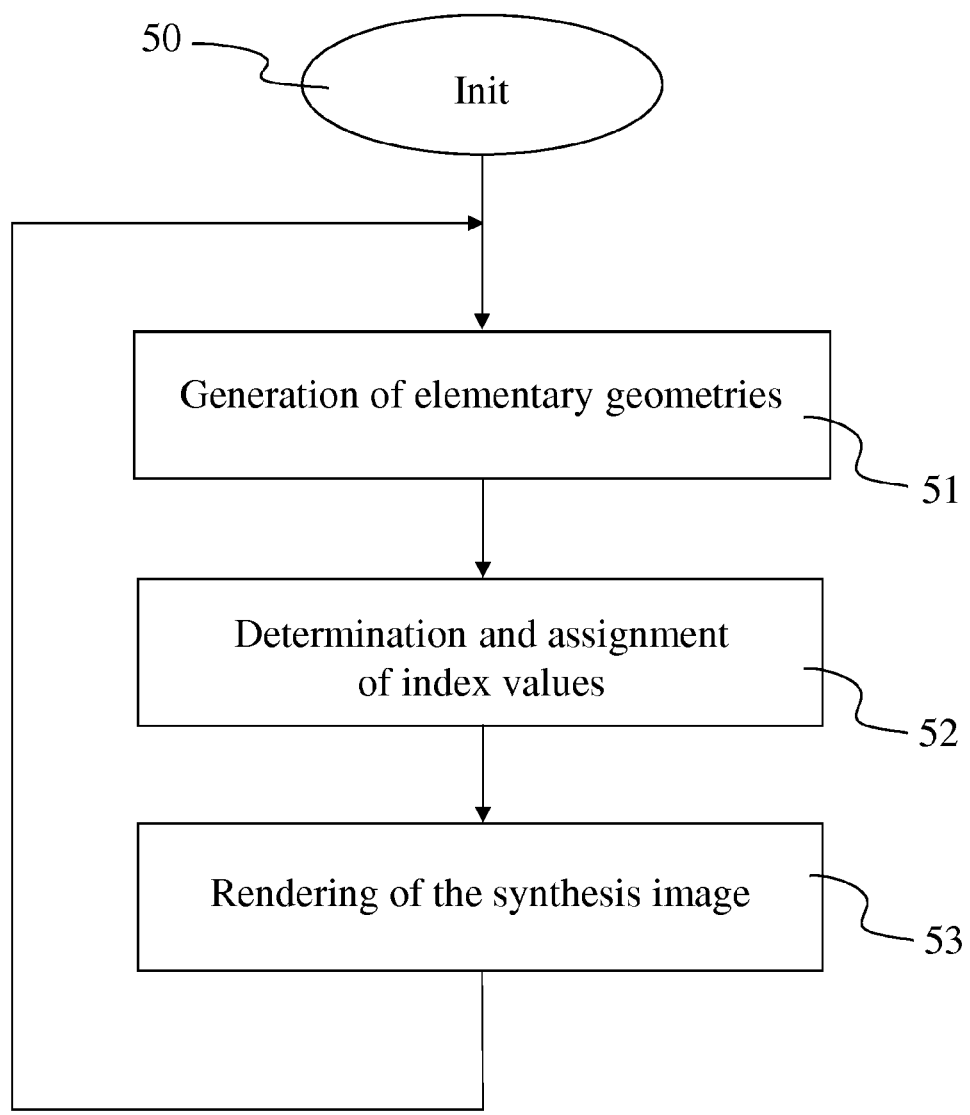

The invention will be better understood, and other specific features and advantages will emerge upon reading the following description, the description making reference to the annexed drawings wherein:

FIG. 1 diagrammatically shows the different stages of a graphics hardware pipeline, according to a particular embodiment of the invention, FIGS. 2A, 2B and 2C diagrammatically show the subdividing of an input geometry in a plurality of elementary geometries in one or several stages of the pipeline of FIG. 1, according to an embodiment of the invention, FIG. 3 diagrammatically shows a method for rendering an object of a synthesis image by using the elementary geometries of FIG. 2C, according to an embodiment of the invention, FIG. 4 shows a device implementing a method for rendering at least an object of a synthesis image by using the elementary geometries of FIG. 2C, according to an embodiment of the invention, FIG. 5 shows a method for rendering at least an object of a synthesis image, according to a particular embodiment of the invention.

5. DETAILED DESCRIPTION OF EMBODIMENTS OF THE INVENTION

FIG. 1 diagrammatically shows a hardware embodiment of a graphics hardware pipeline 1, also called rendering pipeline 1, according to a particular and non-restrictive embodiment of the invention. The rendering pipeline 1 is associated with a GPU (Graphics Processing Unit).

The input geometry 100 of the pipeline 1 corresponds to a surface to be rendered, generally called a patch. For rendering purpose, the input geometry 100 may be subdivided into several elementary geometries. The input geometry 100 corresponds for example to a quadrilateral or a square but may be any kind of geometric surface (for example a triangle).

The input geometry 100 is provided to the first stage of the rendering pipeline 1, called the Vertex Shader 10. The Vertex Shader 10 is the first programmable stage in the rendering pipeline 1 that handles the processing of each vertex of the input geometry 100. The Vertex Shader 10 processes each input vertex of the input geometry 100, user-defined attributes being associated to the input vertex, such as for example its position, a normal vector and texture coordinates. For each input vertex, the Vertex Shader 10 output one output vertex to be transmitted to the next stage of the rendering pipeline 1, i.e. the tessellation control stage 11. The output vertex is outputted from the Vertex Shader 10 with user-defined output attributes, including for example the user-defined input attributes and more. For example, the output attributes comprise the binormal estimated from the tangent and the normal associated with a vertex. Each vertex is processed within the Vertex Shader 10, a shader corresponding to a micro program (using HLSL (High Level Shader Language) language or GLSL (OpenGL Shading Language) for example) comprising instructions for processing each vertex. If the input geometry 100 corresponds to a quadrilateral, the Vertex Shader 10 will process 4 independent input vertices and will output 4 independent output vertices, the 4 output vertices being transmitted to the tessellation control stage 11 for further processing. The vertex shader 10 processes independent vertices, meaning that it processes each vertex independently from the other vertices, i.e. without any information about the other vertices.

The tessellation Control 11 corresponds to the second stage of the rendering pipeline 1. The shader of the tessellation control stage 11 receives an array with the vertices of the input patch. The tessellation control stage is invoked for each vertex and computes the attributes for each of the vertices that make up the output patch, also stored in an array. According to a variant, if some of the attributes associated to a patch are identical (for example a same color associated to each vertex of a patch), this or these common attributes are associated to the patch which enables to reduce the amount of information to be transmitted (one information associated to the patch instead of x same information associated to x vertices, x being an integer greater than 2). The tessellation control shader is also in charge of associating attributes with the output patch, these attributes defining the subdivision degree of the patch. For example, a patch corresponding to a rectangle may be subdivided into i×j quads, i and j being integer comprised between 1 and 64, 128 or 256 for example. The more important the subdivision degree is (i.e. the more bigger i and j are), the more smoother the surface to be rendered is. Of course, the more important the subdivision degree is, the more important the computation needs are. Of course, the patches resulting from the subdivision may be another geometric form, for example triangles, the number of triangles being then equal to 2×ij. The subdivision degree is controlled by tessellation levels, the number of tessellation levels being comprised between 0 and typically 64. The tessellation levels control the subdivision of each side of the patch and the interior of the patch. For example, there are 4 outer tessellation levels (one for each side) and 2 inner tessellation levels for a patch being a quad and there are 3 outer tessellation levels (one for each side) and 1 inner tessellation level for a patch being a triangle. At the output of the tessellation control stage 11, we have a set of vertices with attributes and a set of tessellation levels associated with the patch (corresponding to the input geometry 100), which are transmitted to the tessellator 12.

The tessellator 12 (also called TPG, i.e. Tessellation Primitive Generator) corresponds to the third stage of the rendering pipeline 1. The tessellator 12 is responsible for generating elementary geometries (also called geometric primitives or primitives) according to the input geometry (the patch) and the tessellation levels set at the previous stage 11. An elementary geometry being defined with its vertices, the tessellator 12 is responsible for the generation of new vertices inside the patch 100, attributes such as tessellation coordinates being associated with each new vertex. The number of elementary geometries generated by the tessellator stage 12 is directly dependent from the tessellation levels set at previous stage 11.

The tessellation evaluation 13 corresponds to the fourth stage of the rendering pipeline 1. The tessellation evaluation shader 13 is invoked for each newly created vertex. It is responsible for placing an input vertex, according to the tessellation coordinates, and possibly other parameters such as a displacement map for example.

The geometry shader 14 corresponds to the fifth stage of the rendering pipeline 1. The geometry shader 14 receives as input the elementary geometries (primitives) generated at the previous stages 12 and 13. For each elementary geometry received as an input, the geometry shader has access to all the vertices that form the elementary geometry. The geometry shader 14 governs the processing of the elementary geometries, according to the instructions comprised in the shader. According to the invention, the geometry shader comprises instructions for generating an index value to be assigned to each elementary geometries, according to the attributes (for example the coordinates) associated with at least two vertices of the elementary geometry, as described with more details with examples with regard to FIG. 2C.

After rasterization and interpolation processes not illustrated on FIG. 1 (which enables respectively to determine which pixels of the final synthesis image are part of each elementary geometry and to compute the attributes for each pixel based on the vertex attributes and the pixel's distance to each vertex screen position), fragments generated during the rasterization process (whose attributes have been computed during the interpolation process) are processed by the fragment shader 15, corresponding to the sixth stage of the rendering pipeline 1 illustrated on FIG. 1. The fragment shader 15 process each fragment as to obtain a set of colors (for example RGB values) and a depth value associated with each fragment. If a fragment is visible from a given point of view (the visibility may be determined according to the depth value associated with the fragment, by using for example techniques such as z-buffer technique), the color attributes associated with the fragment are associated to a pixel of the rendered synthesis image.

FIGS. 2A, 2B and 2C diagrammatically illustrate different steps for subdividing an input geometry 100 into a plurality of elementary geometries and for assigning a unique index value to each generated elementary geometry, according to a particular and non-restrictive embodiment of the invention.

FIG. 2A illustrates the input geometry 2, corresponding to the input geometry 100 of FIG. 1, which is defined with its four vertices A, B, C and D. Coordinates of the vertices A, B, C and D are normalized and corresponds respectively to (0,0), (1,0), (0,1) and (1,1) in the space of the input geometry (x,y). The input geometry 2 is a rectangle in the example of FIG. 2A. The input geometry 2 is subdivided into i columns and j lines, i and j corresponding to the outer tessellation levels. As the input geometry is a rectangle in the non-limitative example of FIG. 2A, lower and upper edges have the same dimension, left and right edges have the same dimension. The tessellation levels for the upper and lower edges are thus identical (and corresponds to a same value i) and the tessellation levels for the left and right edges are identical (and corresponds to a same value j). The input geometry 2 is subdivided into i×j quads referenced 20 . . . 2i . . . 2ij. Each quad is defined with its vertex or vertices, the coordinates associated with the vertices being normalized and comprised between 0 en 1 for the x and y abscises. Each quad 20 . . . 2i . . . 2ij is defined for example with one vertex (for example the left lower vertex), with two, three or four vertices.

FIG. 2B illustrates the subdivision of each quad 20 . . . 2i . . . 2ij into 2 elementary geometries, corresponding to triangles 201, 202 . . . 2i1, 2i2 . . . 2ij1, 2ij2 in the non-limitative example of FIG. 2B. The number of elementary geometries is equal to 2×i×j, twice the number of quads 20 . . . 2i . . . 2ij. Each elementary geometry is defined with at least one of its vertices, the coordinates associated with the vertices being normalized and comprised between 0 en 1 for the x and y abscises. Each elementary geometry 201, 202 . . . 2i1, 2i2 . . . 2ij1, 2ij2 is defined for example with one vertex (for example the left lower vertex or the vertex opposed to the hypotenuse), with two or three vertices.

FIG. 2C illustrates the assigning of an index value to the elementary geometries 201, 202 . . . 2i1, 2i2 . . . 2ij1, 2ij2 of FIG. 2B. For the sake of clarity, only one of the j lines is represented, for example the line where j=1. According to this example, a number of 2i triangles 201, 202, 211, 212, 221, 222, 2i1 and 2i2 are represented. The index value assigned to the triangles 201, 211, 221, 2i1, 202, 212, 2i2 and 222 are respectively 0, 1, 2, 3, 4, 5, 6 and 7 and are computed as described below.

The computation of an index value to be assigned to one elementary geometry (for example the triangle 201) comprises the following steps:
determining the minimal coordinates ($x_{min}$, $y_{min}$) of the elementary geometry by comparing to each other the coordinates of all vertices of the elementary geometry. In case of the elementary geometry referenced 201, the minimal coordinates are (0,0).
determining if the elementary geometry is an upper triangle or a lower triangle, or in other words, determining if the elementary geometry (201) defines the upper or lower part of the quadrilateral (20) to which it belongs:
if an edge of the elementary geometry (201) is along $y_{min}$, the elementary geometry (201) defines the lower part of the quadrilateral,
otherwise, the elementary geometry (201) defines the upper part of the quadrilateral.
determining the index value to be assigned to the elementary geometry, the index value being equal to:
i $x_{min}$+2j $y_{min}$, if the elementary geometry is a lower triangle, or $$i\, x_{min} + 2ij\left(y_{min} + \frac{1}{2j}\right),$$

if the elementary geometry is an upper triangle,
In the example of FIGS. 2B and 2C where the elementary geometry is the triangle (201), triangle (201) corresponds to the lower triangle of the quadrilateral (20), $x_{min}$=0 and $y_{min}$=0, i=4 and j=6, the index value to be assigned to the triangle (201) is thus:

Index_value$_{201}$=4×0+2×6×0=0

If the elementary geometry corresponds to the triangle (202) corresponding to the upper triangle of quadrilateral (20), we have $x_{min}$=0 and $y_{min}$=0, i=4 and j=6, the index value to be assigned to the triangle (202) is thus:

$$\text{Index\_value}_{202} = 4 \times 0 + 2 \times 4 \times 6 \times \left(0 + \frac{1}{2 \times 6}\right) = 4$$

If the elementary geometry corresponds to the triangle (211) corresponding to the lower triangle of quadrilateral (21), we have $x_{min}$=0.25 and $y_{min}$=0, i=4 and j=6, the index value to be assigned to the triangle (202) is thus:

Index_value$_{211}$=4×0.25+2×6×0=1.

In a same manner, the index values to be assigned to each triangles 212, 221, 222, 2i1, 2i2 to 2ij1, 2ij2 are computed as described above, the index values assigned to triangles 212, 221, 222, 2i1, 2i2 being respectively 5, 2, 6, 3, 7.

According to another non-limitative example, the elementary geometry obtained from the input geometry 2 corresponds to the quadrilateral 20, 21, 2i . . . 2ij. According to this example, the quadrilateral are not subdivided into triangles and it is not necessary to determine if the elementary geometry is an upper or a lower elementary geometry. The number of elementary geometries is then i×j. The index values to be assigned to the quadrilaterals 20, 21, 2i . . . 2ij is determined in a same way as described with regard to the triangles, but with different formulas, as follow:

determining the minimal coordinates ($x_{min}$, $y_{min}$) of the elementary geometry by comparing to each other the coordinates of all vertices of the elementary geometry. In case of the elementary geometry referenced 20, the minimal coordinates are (0,0).

determining the index value to be assigned to the elementary geometry, the index value being equal to:

$$\text{index\_value} = i\, x_{min} + ij\, y_{min}, \text{ for each quadrilateral of the input geometry } \mathbf{2}.$$

In the case where the elementary geometry is the quadrilateral 20, $x_{min}=0$ and $y_{min}=0$, i=4 and j=6, the index value to be assigned to the quadrilateral (20) is thus:

$$\text{Index\_value}_{20} = 4 \times 0 + 4 \times 6 \times 0 = 0.$$

In the case where the elementary geometry is the quadrilateral 21, $x_{min}=0.25$ and $y_{min}=0$, i=4 and j=6, the index value to be assigned to the quadrilateral (21) is thus:

$\text{Index\_value}_{21} = 4 \times 0.25 + 4 \times 6 \times 0 = 1.$

In the case where the elementary geometry is the quadrilateral 22, $x_{min}=0$ and $y_{min}=\frac{1}{6}$, i=4 and j=6, the index value to be assigned to the quadrilateral (22) is thus:

$$\text{Index\_value}_{22} = 4 \times 0 + 4 \times 6 \times \tfrac{1}{6} = 4.$$

Advantageously, an index value is computed and assigned to each elementary geometry of the input geometry 2. The computation and assignment of the index-value is performed at the geometry shader stage of the rendering pipeline.

According to a variant, an index value is computed for only a part of the plurality of the elementary geometries and thus assigned to only a part of the elementary geometries. For example, if too many elementary geometries are generated at the tessellation stage and only a part of them is needed for the rendering of an object, an index value is computed and assigned to only the number of elementary geometries needed for the rendering of the object.

Assigning an index value to a given elementary geometry enables to identify the given elementary geometries among the plurality of elementary geometries and to break the dependence between the elementary geometries. A programmer may then select it and use it for modelling the polygonal mesh representing the surfaces of the objects of a synthesis image when rendering the synthesis image.

Naturally, the input geometry is not limited to a rectangle but may be any polygonal geometry, for example a quadrilateral, a triangle or an isoline. The input geometry 2 may also be subdivided in any polygon, for example a quad, a triangle or a line segment.

FIG. 3 illustrates the rendering of an object (39) of a synthesis image by using the indexed elementary geometries of FIG. 2C, according to a particular and non-limitative embodiment of the invention.

According to this particular embodiment, the objects (or part of the objects) of the virtual environment forming the synthesis image are rendered by using one or several procedural functions 31. A grammar comprising generation rules and rule parameters is used for generating the objects. The generation rules correspond for example to parametric functions calling the rule parameters for generating the objects. The grammar is advantageously represented with a tree with several branches, each branch comprising one or several terminal symbols. The tree is advantageously generated by a rule compiler running on the CPU. The grammar is provided at the input of the rendering pipeline, some of the stages of the rendering pipelines being illustrated on FIG. 3: the tessellation control 33, the tessellator 34, the geometry shader 35. At the tessellation control stage 33, the number of terminal symbols is determined, the total number of determined terminal symbols corresponding advantageously to the number of elementary geometries needed for the rendering of the object. Determining the number of terminal symbols by parsing the tree according to the rule parameters enables to determine the subdivision level of the input geometry 32, i.e. enables to determine the number of elementary geometries. The rendering method illustrated on FIG. 3 comprises the following steps:

1. Upload the generation rules and the rules parameters 31 under the form of a rule byte code and the set of rule parameters to the rendering pipeline,
2. Upload the input geometry 32 to the rendering pipeline,
3. Set a terminal symbol counter to 0,
4. Parse the grammar, stopping the branches as soon as a terminal symbol is reached,
5. Increment the counter for each reached terminal,
6. Determine a tessellation level so that the number of generated elementary geometries is at least equal to the number of terminal symbols
7. Send this information to the tessellator 34
8. For each generated elementary geometry:
    (a) determine the index value to be assigned to the elementary geometry as described with regard to FIGS. 2A to 2C
    (b) execute the grammar until the $i^{th}$ terminal symbol has been found
    (c) associate an indexed elementary geometry to the $i^{th}$ terminal symbol, the associated elementary geometry representing the terminal symbol, i.e. with a set of attributes describing the terminal type and parameters.

The steps 8(*a*), 8(*b*) and 8(*c*) are advantageously repeated for each terminal symbol as to associate one elementary geometry to each terminal symbol as to obtain a terminal structure. The terminal structure is transmitted to the terminal evaluator 37 for fetching the geometric primitives of each terminal, stored into buffers on the GPU. The object 39 is then rendered by the renderer 38, using classic rasterization/rendering pipeline.

FIG. 4 diagrammatically shows a hardware embodiment of a device 4 configured for the rendering of a virtual environment, and more specifically for generating elementary geometries and computing and assigning index values to the elementary geometries. The device 4 is also configured for the creation of display signals of one or several synthesis images representative of the virtual environment. The device 4 corresponding for example to a personal computer (PC), a laptop or a games console.

The device 4 comprises the following elements, connected to each other by a bus 45 of addresses and data that also transports a clock signal:

- a microprocessor 41 (or CPU),
- a graphics card 42 comprising:
    - several Graphical Processor Units (or GPUs) 420,
    - a Graphical Random Access Memory (GRAM) 421,
- a non-volatile memory of ROM (Read Only Memory) type 46,
- a Random Access Memory or RAM 47,
- one or several I/O (Input/Output) devices 44 such as for example a keyboard, a mouse, a webcam, and
- a power source 48.

The device 4 also comprises a display device 43 of display screen type directly connected to the graphics card 42 to display notably the display of synthesized images calculated and composed in the graphics card, for example live. The use of a dedicated bus to connect the display device 43 to the graphics card 42 offers the advantage of having much greater data transmission bitrates and thus reducing the latency time for the displaying of images composed by the graphics card. According to a variant, a display device is external to the device 4 and is connected to the device 4 by a cable transmitting the display signals. The device 4, for example the graphics card 42, comprises a means for transmission or connection (not shown in FIG. 4) adapted to transmit a display signal to an external display means such as for example an LCD or plasma screen or a video-projector.

It is noted that the word "register" used in the description of memories 421, 46 and 47 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 41 loads and executes the instructions of the program contained in the RAM 47.

The random access memory 47 notably comprises:
in a register 470, the operating program of the microprocessor 41 responsible for switching on the device 4,
parameters 471 representative of the virtual environment (for example modelling parameters of the object(s) of the virtual environment, lighting parameters of the virtual environment).

The algorithms implementing the steps of the method specific to the invention and described hereafter are stored in the memory GRAM 421 of the graphics card 42 associated with the device 4 implementing these steps. When switched on and once the parameters 471 representative of the environment are loaded into the RAM 47, the graphic processors 420 of the graphics card 42 load these parameters into the GRAM 421 and execute the instructions of these algorithms in the form of microprograms of "shader" type using HLSL (High Level Shader Language) language or GLSL (OpenGL Shading Language) for example.

The random access memory GRAM 421 notably comprises:
in a register 4211, the parameters representative of the virtual environment,
in a register 4212, the coordinates of the vertices of the elementary geometries and/or of the input geometry,
index values 4213 assigned to the elementary geometries,
one or more values 4214 representative of the number of elementary geometries to be generated and/or representative of tessellation levels.

According to a variant, the coordinates and the values 4213 and 4214 are stored in the RAM 47 and processed by the microprocessor 41.

According to another variant, a part of the RAM 47 is assigned by the CPU 41 for storage of the coordinates and of the values 4213 and 4214 if the memory storage space available in GRAM 421 is insufficient. This variant however causes greater latency time in the composition of an image comprising a representation of the environment composed from microprograms contained in the GPUs as the data must be transmitted from the graphics card to the random access memory 47 passing by the bus 45 for which the transmission capacities are generally inferior to those available in the graphics card for transmission of data from the GPUs to the GRAM and vice-versa.

According to another variant, the power supply 48 is external to the device 4.

FIG. 5 shows a method for rendering a synthesis image implemented in a device 4, according to a first non-restrictive particularly advantageous embodiment of the invention.

During an initialisation step 50, the different parameters of the device 4 are updated. In particular, the parameters representative of the virtual environment represented in the synthesis image are initialised in any way.

Then during a step 51, a plurality of elementary geometries are generated from an input geometry. One or several vertices are associated with each elementary geometry, the number of vertex (vertices) associated to each elementary geometry is dependent from the type of elementary geometry. For example, if the elementary geometry is a triangle, one, two or three vertices are associated with it as to define the elementary geometry. If the elementary geometry is a quadrilateral, one, two, three or four vertices may be associated with it as to define the quadrilateral. Coordinates (for example x and y) are associated to each vertex. The generation of the elementary geometries is advantageously performed at the tessellator stage of the rendering pipeline of a GPU of the graphic board. In a advantageous way, several different sets of elementary geometries are generated in parallel on several rendering pipeline of GPUs (one set is generated on one rendering pipeline of one GPU), which enables to model several objects of the virtual environment in parallel, thus speeding up the rendering of the synthesis image representing the virtual environment.

The number of elementary geometries to be generated is predefined or set by the programmer and depends from the rendering quality that the programmer wants to obtain for the object to be modelled with the generated elementary geometries, the more elementary geometries, better the quality. For example, the number of elementary geometries generated from one patch is comprised between 2 and 8192 (64*64*2) or 32768 (128*128*2) elementary geometries. The number of generated elementary geometries may be even greater by using for example more than one input patch, for example 2, 3 or 5 input patches. The number of elementary geometries is advantageously predefined or set when the synthesis image is generated with a dense polygonal mesh, implementing for example techniques such as "per-vertex displacement mapping" or "per-pixel displacement mapping". Displacement mapping enables the fine details of surfaces of virtual objects (for example a building façade) to be simulated without modifying the geometric definition of the virtual object of the virtual environment, being based on a simplified mesh of the object and on the displacement of a texture by use of height maps corresponding to the details of the surface of the object. This technique enables the saturation of the graphic pipeline to be avoided that can cause the processing of a high number of graphic primitives (that describe the way in which the polygons or triangles constituting the mesh of the object are connected to each other).

According to a specific embodiment, the number of elementary geometries to be generated is determined, specifically when the synthesis image is generated from a grammar comprising one or more procedural rules and a set of associated rule parameters. According to this particular example, the determination of the number of elementary geometries to be generated comprises the steps of:
representing the grammar with a tree, the tree being representative of the procedural rule(s),
determination of a number of terminal symbols by parsing the tree according to the set of rule parameters.

According to this specific embodiment, the number of elementary geometries to be generated corresponds to the determined number of terminal symbols. The determination of the number of elementary geometries is advantageously performed at the tessellation control stage of the rendering pipeline, the tessellation levels of the input geometry being determined from the determined number of terminal symbols.

Then during a step 52, an index value is estimated from the coordinates of one vertex (or more vertices) of an elementary geometry, then assigned to this elementary geometry. As described with regard to FIG. 2C, the formulas used for estimating an index value to be assigned to a elementary geometry are dependent from the type of the elementary geometry, an elementary geometry being of the type of triangle, quad, isoline for example.

According to a specific and non-limitative embodiment wherein the elementary geometry correspond to a triangle obtained for example from a quadrilaterals subdivided into two triangles, i.e. a lower triangle or an upper triangle. According to a variant, the triangle elementary geometry is obtained by subdividing an input geometry having the form of a triangle. The index value is determined as follow:
- determining the minimal coordinates ($X_{min}$, $y_{min}$) of the triangle, $x_{min}$ and $y_{min}$ being normalized between 0 and 1,
- determining if the triangle is an upper triangle or a lower triangle,
- determining the index value to be assigned to the triangle, the index value being equal to:
  $i.x_{min}+2.i.j.y_{min}$, if the triangle geometry is a lower triangle, or $$i\, x_{min} + 2ij\left(y_{min} + \frac{1}{2j}\right),$$

if the triangle mangle is an upper triangle,
wherein i×j corresponds to the number of quadrilaterals.

Advantageously, the determination of the index value and the assignment of the index value to an elementary geometry are implemented in a geometry shader of a graphics hardware pipeline (also called rendering pipeline) of one or several GPUs. According to a variant, the determination of the index value and the assignment of the index value to an elementary geometry are implemented in a program (for example in C++ or Java) running on a CPU.

In an advantageous way, an index value is determined and assigned to each one of the generated elementary geometries. According to a variant, index values are determined and assigned to each one of only a part of the generated elementary geometries, for example when more elementary geometries have been generated than needed for the modelling of a surface of an object.

Then, during a step 53, the indexed elementary geometries are used for the rendering of at least a part of a synthesis image, i.e. for the rendering of a surface of an object of a virtual environment represented by the synthesis image. As the elementary geometries are each indexed, the artist who creates the synthesis image may freely choose such or such elementary geometry for the rendering of such or such surface, thus increasing the quality of the rendering. According to a variant, notably when the virtual environment is generated via a grammar of procedural rules, each indexed elementary geometry is assigned to each terminal symbol of the tree representing the procedural rules.

The steps 51, 52 and 53 are advantageously reiterated for several sets of elementary geometries for the rendering of several surfaces of one or more virtual objects of the virtual environment represented by the synthesis image. According to a variant, the rendering pipelines of several GPUs (for example 1 to 5 GPUs each comprising a number of cores comprised for example between one hundred to several thousands of cores) are used in parallel for the rendering of the different surfaces of the virtual object(s).

Naturally, the invention is not limited to the embodiments previously described.

In particular, the invention is not limited to a method for rendering a synthesis image but also extends to any device implementing this method and notably any devices comprising at least one GPU. The implementation of calculations necessary to the generation of elementary geometries, to the determination of index values to be assigned to the elementary geometries is not limited either to an implementation in shader type microprograms but also extends to an implementation in any program type, for example programs that can be executed by a CPU type microprocessor.

The use of the invention is not limited to a live utilisation but also extends to any other utilisation, for example for processing known as postproduction processing in a recording studio for the display of synthesis images for example. The implementation of the invention in postproduction offers the advantage of providing an excellent visual display in terms of realism notably while reducing the required calculation time.

The invention also relates to a method for assigning index values to elementary geometries used for the rendering of a virtual environment for the display or composition of a video image, in two dimensions or in three dimensions.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The present invention may be used in video game applications for example, whether via programs that can be executed in a PC or portable type computer or in specialised game consoles producing and displaying images live. The device 4 described with respect to FIG. 4 is advantageously equipped with interaction means such as a keyboard and/or joystick, other modes for introduction of commands such as for example vocal recognition being also possible.

The invention claimed is:

1. A method of rendering a computer graphic image modelling a surface of a virtual object, comprising:
generating, by a processor, a plurality of elementary geometries by subdividing an input geometry based on a tessellation level, a plurality of vertices being associated with each elementary geometry, each vertex being defined with coordinates, wherein the tessellation level corresponds to a quality of the computer graphic image,
assigning, by the processor, an index value to each elementary geometry of at least a part of the elementary geometries, the index value being computed from the coordinates defining at least one vertex of the elementary geometry,
the elementary geometries correspond to triangles, the triangles being obtained from quadrilaterals subdivided into two triangles, each quadrilateral comprising a lower triangle and an upper triangle, the assigning of the index value comprising, implemented for each elementary geometry of the at least a part of the elementary geometries:
determining minimal coordinates ($x_{min}$, $y_{min}$) of the elementary geometry, $x_{min}$ and $y_{min}$ being normalized between 0 and 1,
determining if the elementary geometry is an upper triangle or a lower triangle,
determining an index value to be assigned to the elementary geometry, the index value being equal to:
$i.x_{min}+2.i.j.y_{min}$, if the elementary geometry is a lower triangle, or $$i\, x_{min} + 2ij\left(y_{min} + \frac{1}{2j}\right),$$

if the elementary geometry is an upper triangle,
wherein i×j corresponds to a number of quadrilaterals;
storing the assigned index value assigned to the each elementary geometry in a random access memory; and
rendering providing, by the processor the computer graphic image to a display for rendering by using the indexed elementary geometries.

2. The method according to claim 1 further comprising determining a number of elementary geometries to be generated.

3. The method according to claim 2, wherein the computer graphic image is generated from a grammar comprising at least a procedural rule and a set of rule parameters, the determining of the number of elementary geometries comprising:
representing the grammar with a tree, the tree being representative of the at least a procedural rule,
determining a number of terminal symbols by parsing said tree being representative of the at least a procedural rule according to the set of rule parameters,
the number of elementary geometries to be generated corresponding to the determined number of terminal symbols.

4. The method according to claim 3, further comprising assigning one single indexed elementary geometry to each terminal symbol.

5. The method according to claim 3, wherein the computer graphic image is rendered from the grammar.

6. The method according to claim 1 wherein the assigning of the index value is implemented in a geometry shader of a graphics hardware pipeline.

7. A device configured for rendering a computer graphic image modelling a surface of an virtual object, wherein the device comprises at least a processor and a random access memory, said processor configured for:
generating a plurality of elementary geometries from subdividing an input geometry based on a tessellation level, a plurality of vertices being associated with each elementary geometry, each vertex being defined with coordinates, wherein an higher tessellation level corresponding to an higher quality of the computer graphic image, assigning an index value to each elementary geometry of at least a part of the elementary geometries, the index value being computed from the coordinates associated with at least one vertex of the elementary geometry, the elementary geometries correspond to triangles, the triangles being obtained from quadrilaterals subdivided into two triangles, each quadrilateral comprising a lower triangle and an upper triangle, the assigning of the index value comprising, implemented for each elementary geometry of the at least a part of the elementary geometries:

determining minimal coordinates ($x_{min}$, $y_{min}$) of the elementary geometry, $x_{min}$ and $y_{min}$ being normalized between 0 and 1, determining if the elementary geometry is an upper triangle or a lower triangle, determining an index value to be assigned to the elementary geometry, the index value being equal to:

$i.x_{min}+2.i.j.y_{min}$, if the elementary geometry is a lower triangle, or $$i\ x_{min} + 2ij\left(y_{min} + \frac{1}{2j}\right),$$

if the elementary geometry is an upper triangle, wherein i×j corresponds to a number of quadrilaterals;

storing the assigned index value assigned to the each elementary geometry in the random access memory; and providing the computer graphic image to a display for rendering by using the indexed elementary geometries.

8. The device according to claim 7, wherein the at least a processor is further configured for determining a number of elementary geometries to be generated.

9. The device according to claim 8, wherein the computer graphic image is generated from a grammar comprising at least a procedural rule and a set of rule parameters, the at least a processor being further configured for:

representing the grammar with a tree, the tree being representative of the at least a procedural rule, determining a number of terminal symbols by parsing said tree being representative of the at least a procedural rule according to the set of rule parameters, the number of elementary geometries to be generated corresponding to the determined number of terminal symbols.

10. The device according to claim 9, wherein the at least a processor is further configured assigning one single indexed elementary geometry to each terminal symbol.

11. The device according to claim 9, wherein the computer graphic image is rendered from the grammar.

12. A non-transitory processor readable medium having stored therein instructions for causing a processor to perform at least generating a plurality of elementary geometries by subdividing an input geometry based on a tessellation level, a plurality of vertices being associated with each elementary geometry, each vertex being defined with coordinates, wherein the tessellation level corresponds to a quality of the computer graphic image, assigning, by the processor, an index value to each elementary geometry of at least a part of the elementary geometries, the index value being computed from the coordinates defining at least one vertex of the elementary geometry, the elementary geometries correspond to triangles, the triangles being obtained from quadrilaterals subdivided into two triangles, each quadrilateral comprising a lower triangle and an upper triangle, the assigning of the index value comprising, implemented for each elementary geometry of the at least a part of the elementary geometries:

determining minimal coordinates ($x_{min}$, $y_{min}$) of the elementary geometry, $x_{min}$ and $y_{min}$ being normalized between 0 and 1, determining if the elementary geometry is an upper triangle or a lower triangle, determining the index value to be assigned to the elementary geometry, the index value being equal to:

$i.x_{min}+2.i.j.y_{min}$, if the elementary geometry is a lower triangle, or $$i\ x_{min} + 2ij\left(y_{min} + \frac{1}{2j}\right),$$

if the elementary geometry is an upper triangle, wherein i×j corresponds to a number of quadrilaterals;

storing the assigned index value assigned to the each elementary geometry in a random access memory; and providing the computer graphic image to a display for rendering by using the indexed elementary geometries and depth values associating to each elementary geometries to model the surface of the virtual object.

* * * * *